US010427569B2

(12) United States Patent
Ellis et al.

(10) Patent No.: US 10,427,569 B2
(45) Date of Patent: Oct. 1, 2019

(54) ADJUSTMENT MECHANISM FOR A SEAT

(71) Applicant: Kongsberg Automotive, Inc., Novi, MI (US)

(72) Inventors: Peter Ellis, Livonia, MI (US); Scott Meachum, Milan, MI (US)

(73) Assignee: KONGSBERG AUTOMOTIVE, INC., Novi, MI (US)

(*) Notice: Subject to any disclaimer, the term of this patent is extended or adjusted under 35 U.S.C. 154(b) by 153 days.

(21) Appl. No.: 15/544,744

(22) PCT Filed: Jan. 26, 2015

(86) PCT No.: PCT/US2015/012870
§ 371 (c)(1),
(2) Date: Jul. 19, 2017

(87) PCT Pub. No.: WO2016/122439
PCT Pub. Date: Aug. 4, 2016

(65) Prior Publication Data
US 2018/0009351 A1    Jan. 11, 2018

(51) Int. Cl.
*B60N 2/66*    (2006.01)
*B60N 2/02*    (2006.01)

(52) U.S. Cl.
CPC ......... *B60N 2/6671* (2015.04); *B60N 2/0232* (2013.01); *B60N 2/6673* (2015.04); *B60N 2002/0236* (2013.01)

(58) Field of Classification Search
CPC .. B60N 2/6671; B60N 2/6673; B60N 2/0232; B60N 2/0224; B60N 2/667; B60N 2/66; B60N 2002/0236; A47C 7/462; A47C 7/36; A47C 7/40; A47C 7/46; A47C 3/00

USPC ......... 297/284.1, 284.2, 284.4, 284.5, 284.8, 297/284.9
See application file for complete search history.

(56) References Cited

U.S. PATENT DOCUMENTS

| 3,890,000 A | 6/1975 | Easley |
| 4,159,847 A | 7/1979 | Arai |
| 4,309,058 A | 1/1982 | Barley |
| 4,565,406 A | 1/1986 | Suzuki |

(Continued)

FOREIGN PATENT DOCUMENTS

| CN | 201484242 U | 5/2010 |
| CN | 201525311 U | 7/2010 |

(Continued)

OTHER PUBLICATIONS

English language abstract and computer-generated translation for JPH0672217 extracted from espacenet.com database on Jan. 12, 2018; 7 pages.

(Continued)

*Primary Examiner* — Mark R Wendell
(74) *Attorney, Agent, or Firm* — Howard & Howard Attorneys PLLC

(57) ABSTRACT

A seat, such as a vehicle seat, includes an assembly for use in adjusting a seat support relative to a seat frame to provide a varying level of support to a seat occupant. The assembly includes a chassis mounted on the seat support, a screw drive supported on the chassis, an actuator coupled to the screw drive, a drive block engaging the screw drive, and first and second cables extending from the assembly for adjustable attachment to the seat frame.

25 Claims, 8 Drawing Sheets

(56) References Cited

U.S. PATENT DOCUMENTS

| | | | |
|---|---|---|---|
| 4,588,172 A | 5/1986 | Fourrey et al. | |
| 4,627,661 A | 12/1986 | Ronnhult et al. | |
| 4,697,848 A | 10/1987 | Hattori et al. | |
| 4,880,271 A | 11/1989 | Graves | |
| 4,886,316 A | 12/1989 | Suzuyama et al. | |
| 5,007,677 A | 4/1991 | Ozawa et al. | |
| 5,050,930 A | 9/1991 | Schuster et al. | |
| 5,092,654 A | 3/1992 | Inaba et al. | |
| 5,120,109 A | 6/1992 | Rangoni | |
| 5,197,780 A | 3/1993 | Coughlin | |
| 5,211,071 A | 5/1993 | Hedstrom | |
| 5,217,278 A | 6/1993 | Harrison et al. | |
| 5,307,707 A | 5/1994 | Roelle | |
| 5,449,219 A | 9/1995 | Hay et al. | |
| 5,474,358 A | 12/1995 | Maeyaert | |
| 5,507,559 A | 4/1996 | Lance | |
| 5,641,205 A | 6/1997 | Schmidt | |
| 5,685,606 A | 11/1997 | Lance | |
| 5,697,672 A | 12/1997 | Mitchell | |
| 5,716,098 A | 2/1998 | Lance | |
| 5,769,490 A | 6/1998 | Falzon | |
| 5,788,328 A | 8/1998 | Lance | |
| 5,823,620 A | 10/1998 | Le Caz | |
| 5,913,569 A | 6/1999 | Klingler | |
| 6,053,064 A | 4/2000 | Gowing et al. | |
| 6,055,877 A * | 5/2000 | Welterlin | B60N 2/0232 248/429 |
| 6,079,783 A | 6/2000 | Schuster, Sr. et al. | |
| 6,152,531 A | 11/2000 | Deceuninck | |
| 6,254,186 B1 | 7/2001 | Falzon | |
| 6,357,826 B1 | 3/2002 | Gabas et al. | |
| 6,499,803 B2 | 12/2002 | Nakane et al. | |
| 6,557,938 B1 | 5/2003 | Long | |
| 6,619,739 B2 * | 9/2003 | McMillen | A47C 7/462 297/284.7 |
| 7,000,986 B2 | 2/2006 | Cruz Fernandes de Pinho et al. | |
| 7,172,248 B2 | 2/2007 | McMillen et al. | |
| 7,494,183 B2 | 2/2009 | Liu | |
| 7,690,726 B2 | 4/2010 | Samain | |
| 7,780,233 B2 | 8/2010 | McMillen | |
| 7,841,661 B2 | 11/2010 | Samain et al. | |
| 7,997,649 B2 | 8/2011 | Vanparys et al. | |
| 8,091,967 B2 | 1/2012 | Schweizer et al. | |
| 8,544,953 B2 | 10/2013 | Samain et al. | |
| 9,604,560 B1 | 3/2017 | Ellis | |
| 2005/0017555 A1 | 1/2005 | Elliot | |
| 2008/0217978 A1 | 9/2008 | Stossel et al. | |
| 2008/0265649 A1 | 10/2008 | McMillen et al. | |
| 2009/0115234 A1 | 5/2009 | Samain | |
| 2010/0066136 A1* | 3/2010 | D'Agostini | B60N 2/4228 297/216.12 |
| 2011/0115268 A1 | 5/2011 | Maierhofer et al. | |
| 2014/0070583 A1 | 3/2014 | McMillen et al. | |
| 2014/0070584 A1 | 3/2014 | McMillen et al. | |
| 2014/0125101 A1* | 5/2014 | Hong | B60N 2/66 297/284.4 |
| 2014/0125102 A1 | 5/2014 | McMillen et al. | |
| 2014/0125103 A1 | 5/2014 | Suzuki | |
| 2014/0346827 A1 | 11/2014 | Suzuki et al. | |
| 2015/0305506 A1 | 10/2015 | Suzuki et al. | |
| 2018/0009351 A1 | 1/2018 | Ellis et al. | |

FOREIGN PATENT DOCUMENTS

| | | |
|---|---|---|
| DE | 1914154 A1 | 6/1971 |
| DE | 3336349 A1 | 4/1985 |
| DE | 3341389 A1 | 5/1985 |
| DE | 3613763 A1 | 10/1986 |
| DE | 3633035 A1 | 4/1987 |
| DE | 3619188 C1 | 12/1987 |
| DE | 3620084 A1 | 12/1987 |
| DE | 3821018 A1 | 1/1989 |
| DE | 3939452 A1 | 5/1990 |
| DE | 4008936 A1 | 10/1990 |
| DE | 4405495 A1 | 8/1995 |
| DE | 19505447 A1 | 8/1996 |
| EP | 0016557 A1 | 10/1980 |
| EP | 0046892 A1 | 3/1982 |
| EP | 0128407 A1 | 12/1984 |
| EP | 0158562 A1 | 10/1985 |
| EP | 0169293 A1 | 1/1986 |
| EP | 0296938 A1 | 12/1988 |
| EP | 0201938 A2 | 2/1989 |
| EP | 0420824 A1 | 4/1991 |
| EP | 0458000 A1 | 11/1991 |
| EP | 0485483 A1 | 5/1992 |
| EP | 0517644 A1 | 12/1992 |
| EP | 0518830 A1 | 12/1992 |
| EP | 0540481 A1 | 5/1993 |
| EP | 0563709 A2 | 10/1993 |
| EP | 0582821 A1 | 2/1994 |
| EP | 0598071 A1 | 5/1994 |
| EP | 0618774 A1 | 10/1994 |
| EP | 0702522 A1 | 3/1996 |
| EP | 0759715 A1 | 3/1997 |
| EP | 0803400 A2 | 10/1997 |
| EP | 0915773 A1 | 5/1999 |
| EP | 0957716 A1 | 11/1999 |
| EP | 1733649 A1 | 12/2006 |
| EP | 1918156 A1 | 5/2008 |
| FR | 2447168 A1 | 8/1980 |
| FR | 2596334 A1 | 10/1987 |
| GB | 1536132 A | 12/1978 |
| GB | 1545186 A | 5/1979 |
| GB | 2012569 A | 8/1979 |
| GB | 2285744 A | 7/1995 |
| GB | 2316604 A | 3/1998 |
| JP | H01175808 A | 7/1989 |
| JP | H0274429 A | 3/1990 |
| JP | H04504075 A | 7/1992 |
| JP | H0612448 U | 2/1994 |
| JP | H0672217 A | 3/1994 |
| JP | H0626524 B2 | 4/1994 |
| JP | H0644460 U | 6/1994 |
| JP | H0658757 U | 8/1994 |
| JP | H0675250 U | 10/1994 |
| JP | H0775608 A | 3/1995 |
| WO | 9321800 A1 | 11/1993 |
| WO | 9400039 A1 | 1/1994 |
| WO | 9519123 A1 | 7/1995 |
| WO | 9633640 A1 | 10/1996 |
| WO | 9807590 A1 | 2/1998 |
| WO | 2016094412 A1 | 6/2016 |
| WO | 2016122439 A1 | 8/2016 |

OTHER PUBLICATIONS

English language abstract and computer-generated translation for JPH0775608; 14 pages.

English language computer-generated translation for JPH0626524 extracted from espacenet.com on Jan. 12, 2018; 4 pages.

English language computer-generated translation for JPH0644460 extracted from espacenet.com on Jan. 12, 2018; 5 pages.

English language computer-generated translation for JPH0658757 extracted from espacenet.com on Jan. 12, 2018; 6 pages.

English language computer-generated translation for JPH0675250 extracted from espacenet.com on Jan. 12, 2018; 4 pages.

English language computer-generated translation for JPH0612448 extracted from espacenet.com on Jan. 12, 2018; 3 pages.

English language abstract and computer-generated translation for WO9400039 extracted from espacenet.com on Jan. 12, 2018; 6 pages.

English language abstract and computer generated translation for CN201484242 extracted from espacenet.com on Jan. 12, 2018; 4 pages.

English language abstract and computer-generated translation for CN201525311 extracted from espacenet.com on Jan. 12, 2018; 5 pages.

(56) References Cited

OTHER PUBLICATIONS

English language computer-generated translation for DE1914154 extracted from espacenet.com on Jan. 12, 2018; 4 pages.
English language abstract and computer-generated translation for DE3336349 extracted from espacenet.com on Jan. 12, 2018; 4 pages.
English language abstract and computer-generated translation for DE3341389 extracted from espacenet.com on Jan. 12, 2018; 4 pages.
English language abstract and computer-generated translation for DE3633035 extracted from espacenet.com on Jan. 12, 2018; 4 pages.
English language abstract and computer-generated translation for DE3619188 extracted from espacenet.com on Jan. 12, 2018; 5 pages.
English language abstract and computer-generated translation for DE3620084 extracted from espacenet.com on Jan. 12, 2018; 5 pages.
English language abstract and computer-generated translation for EP0128407 extracted from espacenet.com on Jan. 12, 2018; 4 pages.
English language abstract and computer-generated translation for EP0296938 extracted from espacenet.com on Jan. 12, 2018; 5 pages.
English language abstract and computer-generated translation for EP0301938 extracted from espacenet.com on Jan. 12, 2018; 5 pages.
English language abstract and computer-generated translation for EP0458000 extracted from espacenet.com on Jan. 12, 2018; 8 pages.
English language abstract and computer-generated translation for FR2447168 extracted from espacenet.com on Jan. 12, 2018; 4 pages.
English language abstract and computer-generated translation for FR2596334 extracted from espacenet.com on Jan. 12, 2018; 4 pages.

\* cited by examiner

ADJUSTMENT MECHANISM FOR A SEAT

CROSS-REFERENCE TO RELATED APPLICATIONS

This application is the National Stage of International Patent Application No. PCT/US2015/012870, filed on Jan. 26, 2015, the disclosure of which is hereby incorporated by reference in its entirety.

TECHNICAL FIELD

The subject invention relates to an assembly for use in a seat, such as a vehicle seat.

BACKGROUND

When seated for a long period of time, it is desirable to provide adjustable support to a seat's occupant. Many types of mechanisms providing adjustable support within a seat are known in the art, including both manually adjusted and power-adjusted options. While known adjustment mechanisms may function, there remains an ever-present desire to reduce cost, weight, and complexity, while maintaining or increasing durability, functionality, and manufacturability.

SUMMARY

In one embodiment, an assembly for use in a seat having a seat frame includes a seat support adapted for adjustable suspension in the seat frame. The seat support is adjustable in a first adjustment direction and a second adjustment direction opposite said first adjustment direction. A chassis is mounted on the seat support. A screw drive is supported on the chassis for rotation in a first rotational direction and in a second rotational direction opposite the first rotational direction. An actuator is operably coupled to the screw drive to selectively generate the rotation of the screw drive. A drive block is in threaded engagement with the screw drive such that rotation of the screw drive in the first rotational direction translates the drive block along the chassis in a first translational direction, and rotation of the screw drive in the second rotational direction translates the drive block along the chassis in a second translational direction opposite the first translation direction. A first cable has first and second segments with the first segment adapted for attachment to the seat frame, and the second segment having first and second portions with the first portion engaging the chassis and the second portion affixed to the drive block. A second cable has first and second segments with the first segment adapted for attachment to the seat frame, and the second segment having third and fourth portions with the third portion engaging the chassis and the fourth portion affixed to the drive block.

The second and fourth portions concurrently translate with the drive block in the first translational direction when the screw drive operates in the first rotational direction, adjusting the seat support in the first adjustment direction. Additionally, the second and fourth portions concurrently translate with the drive block in the second translational direction when the screw drive operates in the second rotational direction adjusting the seat support in the second adjustment direction.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE INVENTION

Figure 1:
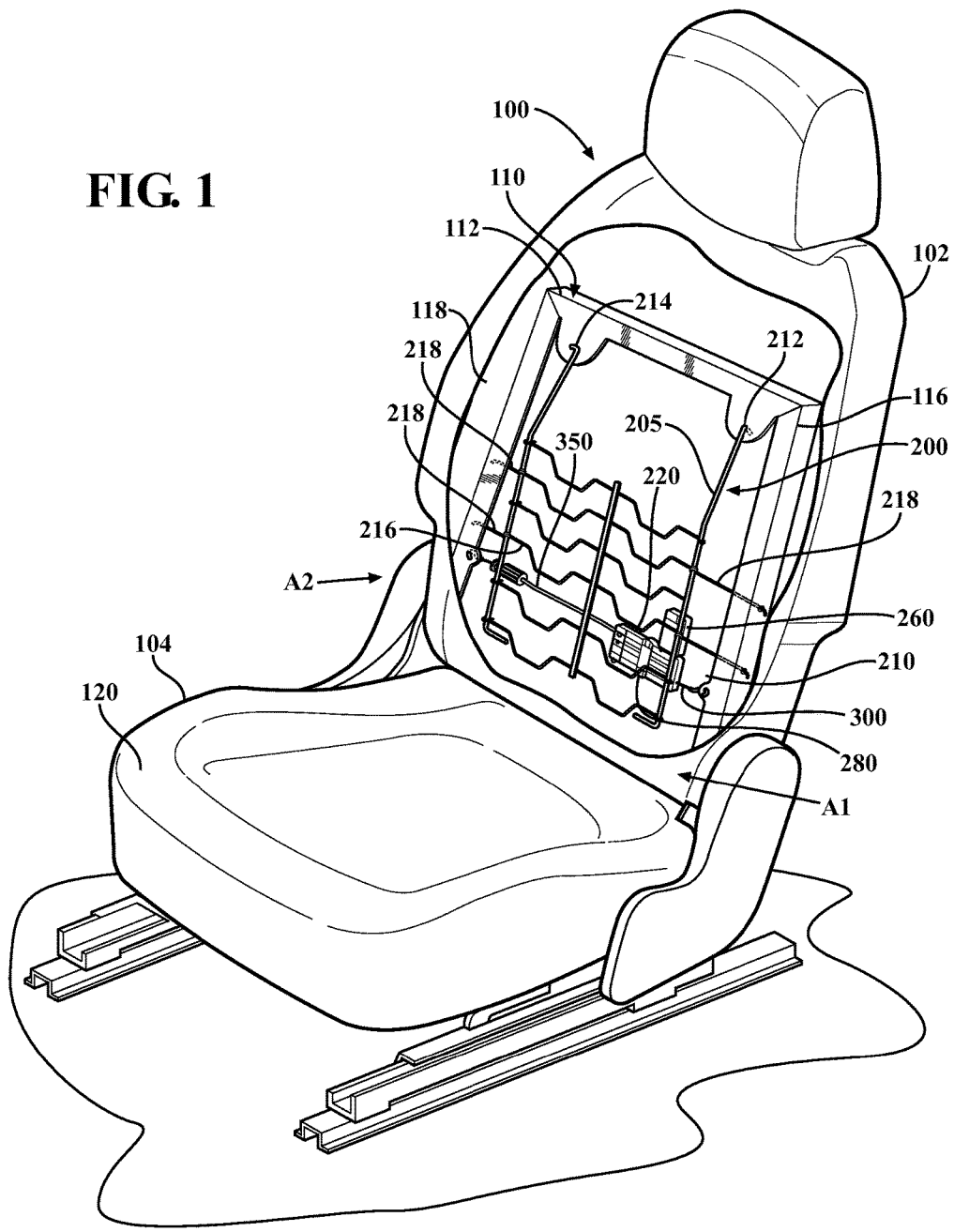
FIG. 1 is a perspective view of an automotive vehicle seat incorporating a seat support and an adjustment mechanism.

Referring to the Figures, wherein like numerals indicate like or corresponding parts throughout the several views, a seat 100 is generally shown in FIG. 1. In the illustrated embodiment, the seat 100 is a vehicle seat. The seat 100 includes a seat back 102 and a seat base 104. The seat back 102 is adjustable relative to the seat base 104 as is known in the art. The seat 100 includes a seat frame 110. As shown in FIG. 1, the seat frame 110 is within the seat back 102. It should be appreciated that the seat base 104 may also include a seat frame 110. Additionally, one or more seat frames 110 may be within a bolster portion of a seat back 102 or a seat base 104.

The seat frame 110 includes a top cross support 112 and a bottom cross support (not shown) spaced apart from and substantially parallel to the top cross support 112. The seat frame 110 also includes right and left side supports 116 and 118 extending between the top cross support 112 and bottom cross support (not shown) to create a periphery to the seat frame 110. The seat frame 110 support members (112, 116, 118) may be formed of sheet metal, structural polymers or other suitable materials as is known in the art. The seat frame 110 may further support a foam cushion or other type of cushion, decorative cover or other upholstery, shown generally at 120.

An assembly 200 is mounted within the seat frame 110 providing adjustable support to a seat occupant. The assembly 200 includes a seat support 205 and an adjustment mechanism 210. The seat support 205 is illustrated in FIG. 1 as a suspension mat-type wire mesh to resiliently support the upholstery cover 120. The adjustment mechanism 210, as will be described in greater detail below, adjusts the mounting position of at least a portion of the seat support 205 relative to the seat frame 110.

The seat support 205 includes a right vertical rod 212 proximate to the right side support 116 of the seat frame 110 and a left vertical rod 214 spaced apart from and substantially parallel to the right vertical rod 212; the left vertical rod 214 proximate to the left side support 118 of the seat frame 110. As used herein throughout, left and right refer to the respective positioning of components as depicted in FIG. 1, and are not intended to be limiting in any way. A series of support wires 216 extend between the left and right vertical rods 212 and 214. The seat support 205 is mounted to the seat frame 110 in part through a series of static connections at hooks 218. The connections at hooks 218 are static in that the hooks 218 extend a constant length beyond the left and right vertical rods 212 and 214, maintaining the separation between the seat frame 110 and the seat support 205. The attachment of the hooks 218 to the seat frame is located within a depth of the seat frame distant from the upholstery cover 120 to provide space for the foam or other cushion between the seat support 205 and upholstery cover 120.

The assembly 200 is further mounted to the seat frame 110 through a series of dynamic connections provided by the adjustment mechanism 210. The connections provided by the adjustment mechanism 210 are dynamic in that the separation distance between the seat support 205 and the seat frame 110 may be adjusted proximate to the point of dynamic connection. The attachment of the dynamic connections is located within a depth of the seat frame proximate to the surface of the upholstery cover 120. That is, the point of dynamic connection to the seat frame is closer to the seat's occupant than the point of static connection described above. The seat support 205 is adjustable in a first adjustment direction A1 relative to the seat frame wherein the seat support 205 is moved toward a seat occupant to provide increased support to the occupant. The seat support 205 is further adjustable in a second adjustment direction A2 relative to the seat frame 110, wherein the seat support 205 is moved in the direction opposite the first adjustment direction A1 to provide decreased support to the occupant.

Figure 2:
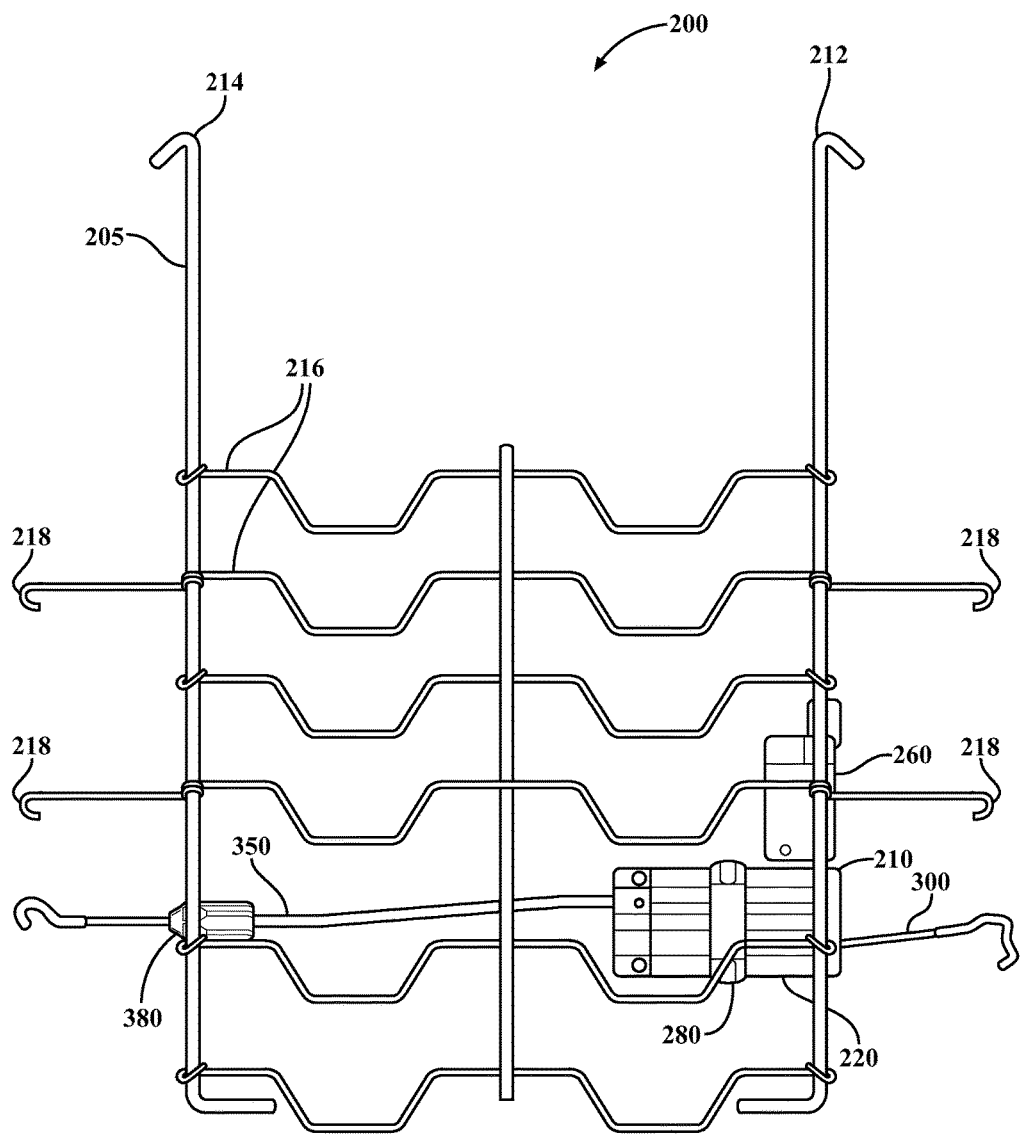
FIG. 2 is a plan view of a seat support and an adjustment mechanism.
Figure 3:
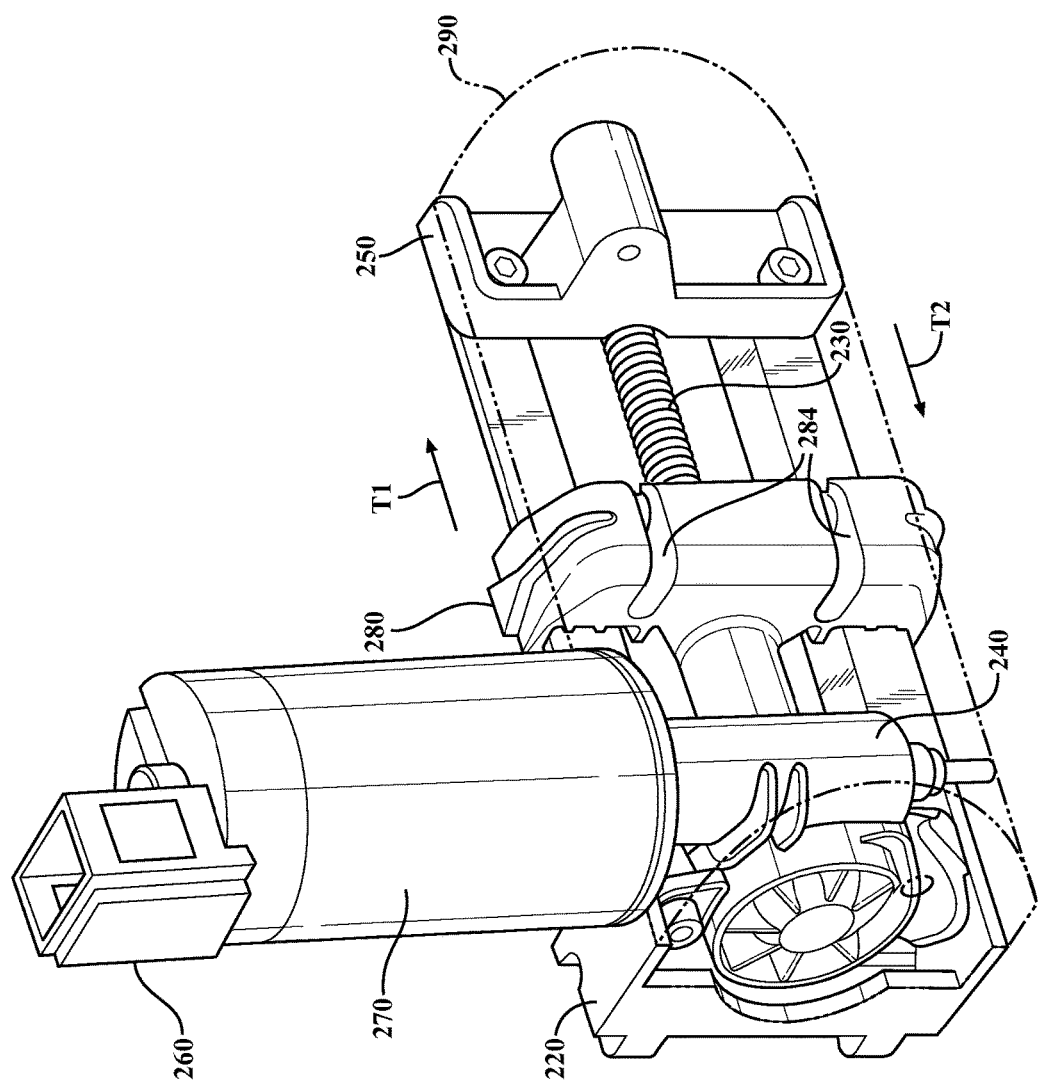
FIG. 3 is a perspective view of an adjustment mechanism.
Figure 4:
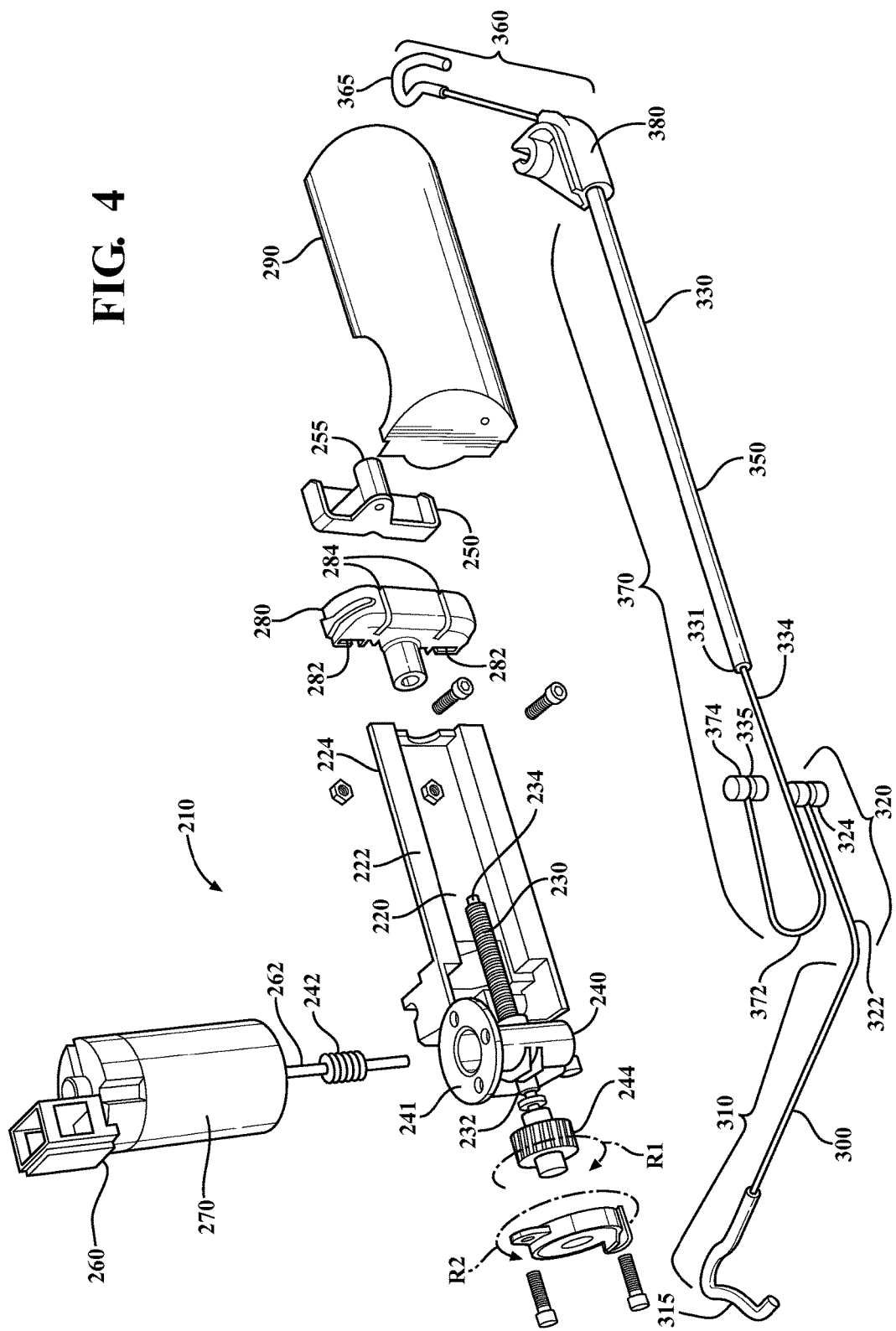
FIG. 4 is an exploded perspective view of an adjustment mechanism.

As shown in FIGS. 2-4, the adjustment mechanism 210 includes a chassis 220 mounted to the seat support 205. The adjustment mechanism 210 further includes a screw drive 230 supported on the chassis 220. The screw drive 230 is supported on the chassis 220 at a first end 232 by a gear box 240 and captured to the chassis at a second end 234 by end stop 250. The gear box 240 couples the screw drive 230 to an actuator 260. The actuator 260 may include a motor 270. A drive block 280 is in threaded engagement with the screw drive 230 between the gear box 240 and the end stop 250. The adjustment mechanism 210 may further include a cover 290 encapsulating the components to the chassis 220.

As illustrated in the Figures, the chassis 220 is mounted to the right vertical rod 212. It should be appreciated that the chassis 220 may instead be mounted to the left vertical rod 214, to one or more of the support wires 216, or to a combination thereof. The chassis 220 provides rigid support and structure to the adjustment mechanism 210. The chassis 220 may be formed of a polymeric material, such as a high-strength structural plastic. Alternatively, the chassis 220 may be formed of metal, or other suitable material as is known in the art.

As shown in FIGS. 3 and 4, the screw drive 230 is supported on the chassis 220 for rotation relative thereto in a first rotational direction R1 and in a second rotational direction R2, opposite the first rotational direction R1. The screw drive 230 includes an externally-threaded rod formed of a suitable material as is known in the art. The screw drive 230 extends along a length of the chassis 220 to linearly convey the drive block 280 in response to rotary motion generated at the actuator 260. The thread form of the screw drive 230 may be selected from among those known in the art to achieve a desired mechanical advantage based on a power capacity of the actuator 260 as well as force requirements to accomplish the seat support 205 adjustment.

The gear box 240 is mounted to the chassis 220 adjacent to the first end 232 of the screw drive 230. The gear box 240 provides a mechanical coupling between the screw drive 230 and the actuator 260. In the illustrated embodiment, as best depicted in FIG. 4, the gear box 240 includes gear box housing 241, a worm 242 and a worm gear 244. The gear box housing 241 may be integral to the chassis 220 as a feature thereof. Alternatively, the gear box housing 241 may be formed as a separate component and mounted to the chassis 220 to become a feature thereof. In alternative embodiments, the gear box 240 may include an alternative selection of gears or other force transmission means depending on the mounting of the actuator 260 relative to the screw drive 230. In further alternative embodiments (not shown), the gear box 240 may omit any specific gearing and may be a feature of the chassis to facilitate the coupling of the screw drive 230 to the actuator 260.

As illustrated in FIG. 4, the worm 242 is integral to a shaft 262 extending from the actuator 260. In alternative embodiments, the worm 242 may be attached to the shaft 262 using various mechanical means suitable for rotation therewith. The worm gear 244 is attached to the screw drive 230 at the first end 232. The worm gear 244 may be integral to the screw drive 230 or may be attached to the screw drive 230 using various mechanical means suitable for rotation therewith. The gear box 240 and components thereof may be formed of a suitable material as is known in the art.

As illustrated in the Figures, the actuator 260 is mounted on the chassis 220. The actuator 260 provides motive force to the adjustment mechanism 210 to adjust the mounting position of at least a portion of the seat support 205 relative to the seat frame 110. In one embodiment, as depicted in the Figures, the actuator 260 includes an electric motor 270 and is mounted on the chassis 220. In alternative embodiments (not shown), the actuator 260 may be remote from the chassis 220 and may, for example, be mounted to the seat support 205 or the seat frame 110. In such embodiments the actuator 260 is coupled to the gear box 240 using mechanical linkages conventional in the art.

The actuator 260 is configured to selectively produce rotational motion conveyed by gear box 240 to rotate the screw drive 230 in the first rotational direction R1 or the second rotational direction R2. The actuator 260 may include an electric motor 270. The size, power and other characteristics of the motor 270 may be selected based on the particular demands of the adjustment application as is known in the art. The actuator 260 may alternatively include a hand crank (not shown) accessible to the seat's occupant to manually produce rotational motion.

As best illustrated in FIGS. 3 and 4, the drive block 280 is in threaded engagement to the screw drive 230 between the gear box 240 and the end stop 250. The drive block 280 engages the screw drive 230 such that as the screw drive 230 is rotated in the first rotational direction R1, the drive block 280 translates linearly along the screw drive 230 in a first translational direction T1. Likewise, as the screw drive 230 is rotated in the second rotational direction R2, the drive block 280 translates linearly along the screw drive 230 in a second translational direction T2, opposite the first translational direction T1. The drive block 280 may be formed of a suitable material as is known in the art.

In some embodiments, the drive block 280 includes one or more guide slots 282. In such embodiments, the chassis 220 includes one or more complementary guide features 222. As depicted in FIG. 4, the guide feature 222 may include an edge 224 about which the guide slot 282 of the drive block 280 extends. The guide slot 282 of the drive block 280 and the complementary guide feature 222 of the chassis 220 cooperate to constrain the drive block 280 against motion in two directions relative to the chassis 220;

thereby limiting the motion of the drive block 280 to translation in the first and second translational direction T1 and T2 relative to the chassis 220.

Optionally, a cover 290 is included to encapsulate the screw drive 230, the gear box 240, end stop 250 and drive block 280 to the chassis 220. As the adjustment mechanism 210, and the assembly 200, generally, are disposed within the cover or other upholstery cover 120 of the seat 100, it may be preferable to ensure that the moving components of the adjustment mechanism 210 are protected against interference. The cover 290 may be mounted to the adjustment mechanism 210 to provide such protection against interference. The cover may include a formed plate, such as of plastic, metal or other suitable material, shaped to encompass the components of the adjustment mechanism 210.

As shown in a first embodiment depicted in FIGS. 1-6, a first cable 300 and a second cable 350 extend from the adjustment mechanism 210 to provide for dynamic connection of the seat support 205 to the seat frame 110. The first and second cables 300 and 350 include flexible cables to transmit mechanical force between the seat support 205 through the adjustment mechanism 210 to the seat frame 110. The first and second cables 300 and 350 engage with the adjustment mechanism 210, and more specifically, the drive block 280. The drive block 280 may include one or more cable slots 284 to accommodate the first and second cables 300 and 350. As the drive block 280 translates in the first translational direction T1, the effective length of the first and second cables 300 and 350 extending beyond the seat support 205 decreases to move at least a portion of the seat support 205 in the first adjustment direction A1 relative to the seat frame 110. Translation of the drive block 280 in the second translation T2 increases the effective length of the first and second cables 300 and 350 extending beyond the seat support 205 to move at least a portion of the seat support 205 in the second adjustment direction A2 relative to the seat frame.

As best shown in FIG. 4, the first cable 300 includes a first segment 310. The first segment 310 extends beyond the seat support 205 and is adapted for attachment to the seat frame 110 at hook 315. The first cable 300 further includes a second segment 320 adapted for engagement with the adjustment mechanism 210. The second segment 320 includes a first portion 322 coupled to the chassis 220 and a second portion 324 coupled to the drive block 280 for movement therewith. As illustrated in FIGS. 1-6 in the first embodiment, the first portion 322 extends through cover 290, if present, and partially about the gear box 240. The second portion 324 includes a terminal end of the first cable 300 secured within cable slot 284 to the drive block 280 for movement therewith. The second portion 324 may include a terminal pin or other retaining means to secure the second portion 324 to the drive block 280 for movement therewith.

Likewise, the second cable 350 includes a first segment 360 extending beyond the seat support 205 and is adapted for attachment to the seat frame 110 at hook 365. The second cable 350 further includes a second segment 370 adapted for engagement with the adjustment mechanism 210. This second segment 370 includes a third portion 372 coupled to the chassis, and a fourth portion 374 coupled to the drive block 280 for movement therewith. As illustrated in FIGS. 1-6 in the first embodiment, the third portion 372 extends through a cable port 255 of the end stop 250 and about the gear box 240. The fourth portion 374 may include a terminal pin or other retaining means to secure the fourth portion 374 to the drive block 280 for movement therewith.

One or both of the first and second cables 300 and 350 may comprise a conduit 330 and a core element 334. More specifically, the first or second cable 300 or 350 transmits mechanical force by movement of the core element 334 relative to the hollow outer conduit 330. The conduit 330 may be formed of a helical steel wire or other rigid support encapsulated within a plastic or other protective sheath. The core element 334 may include a solid, stranded, or braided flexible wire.

As depicted in FIG. 4, the conduit 330 of the second cable 350 includes a first end 331 terminating at cable port 255 of the end stop 250 and a second opposite end terminating at a connector 380. The connector 380 is mounted, for example, on the vertical rod 214 opposite the vertical rod 212 to which the chassis 220 is mounted. The second segment 370 of the of the second cable 350 includes the conduit 330, the core element traversing therethrough and further includes the exposed core element 334 extending from the end stop 250, about the gear box 240 and to the terminal end 335 secured to drive block 280.

As mentioned above, the adjustment mechanism 210 provides dynamic connection between the seat support 205 and the seat frame 110. This dynamic connection is achieved by adjusting the length of the first segments 310 and 360 of the first and second cables 300 and 350 that extend between the seat support 205 and the seat frame 110. A complementary length change occurs in the second and fourth portions 324 and 374 of the first and second cables 300 and 350 between the first end 232 of screw drive 230 and the drive block 280.

More specifically, the seat's occupant can provide an input through the actuator 260, either manually through a hand crank (not shown) or by initiating an electrical command to the motor 270, to adjust the seat support 205 in either the first adjustment direction A1 or the second adjustment direction A2. The actuator 260 is coupled to the screw drive 230 to rotate in either the first rotational direction R1 or second rotational direction R2 respectively. As the screw drive rotates in the first rotational direction R1, the drive block 280 translates in the first translational direction T1. The second and fourth portions 324 and 374 of the first and second cables 300 and 350 are secured to the drive block 280 for movement therewith. The length of the second segments 320 and 370 of the first and second cables 300 and 350 are increased, causing a corresponding decrease in length of the first segments 310 and 360. This causes the seat support 205 to adjust in the first adjustment direction A1. Conversely, actuation of the screw drive 230 in the second rotational direction R2 translates the drive block 280 in the second translational direction T2 decreasing the length of second segments 320 and 370 of first and second cables 300 and 350 and adjusting the seat support 205 in the second adjustment direction A2.

Figure 5:
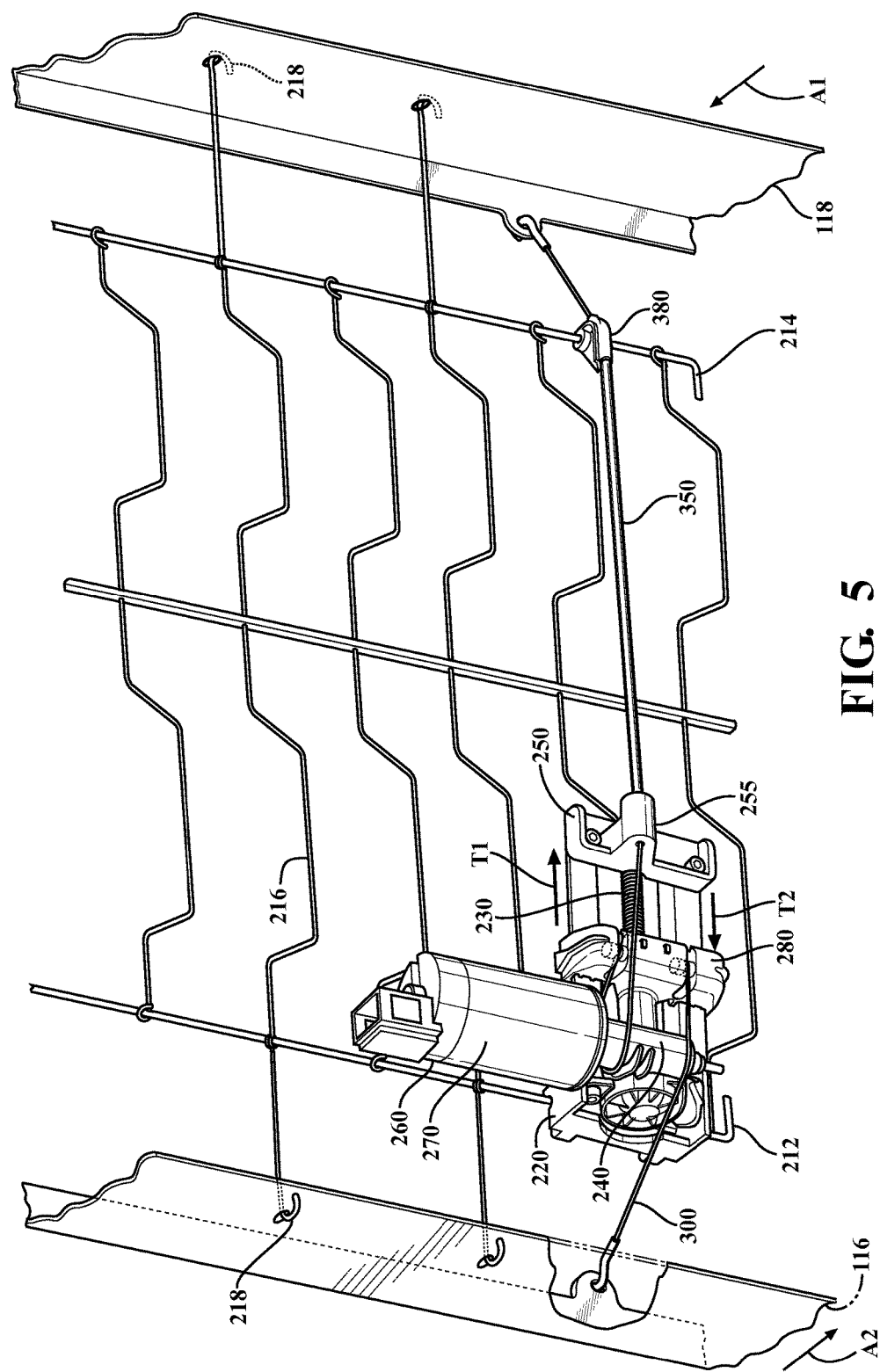
FIG. 5 is a perspective view of a section of the vehicle seat of FIG. 1 in a first configuration according to a first embodiment.

In the first embodiment as illustrated in FIGS. 1-6 and described above, the second and fourth portions 324 and 374 of first and second cables 300 and 350, respectively, are the terminal ends of the first and second cables 300 and 350 coupled to the drive block 280 for movement therewith. FIG. 5 illustrates a section of the vehicle seat 100 in a first configuration according to this first embodiment. In this first configuration, the drive block 280 is proximate to the first end 232 of the screw drive, and the first segments 310 and 360 of first and second cables 300 and 350 are at a maximum extension.

Figure 6:
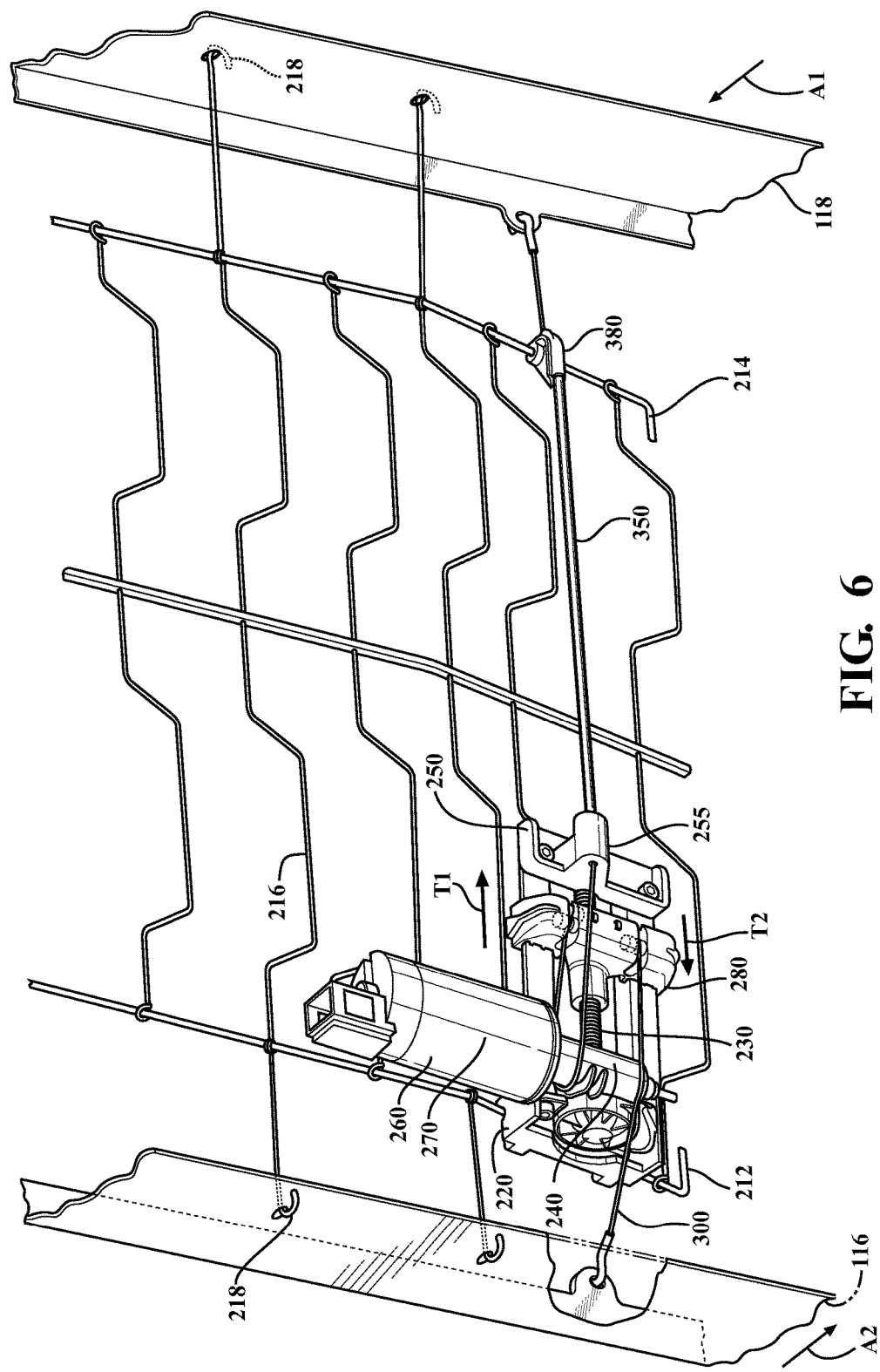
FIG. 6 is a perspective view of a section of the vehicle seat of FIG. 1 in a second configuration according to a first embodiment.

FIG. 6 illustrates a section of the vehicle seat 100 in a second configuration according to the first embodiment. In this second configuration, the drive block 280 has translated along the screw drive toward second end 234, thereby increasing the first and second cable 300 and 350 length extending between the drive block 280 and the first end 232. The length of the first segments 310 and 360 are correspondingly decreased to a minimum extension, adjusting the seat support 205 in the first adjustment direction A1.

Figure 7:
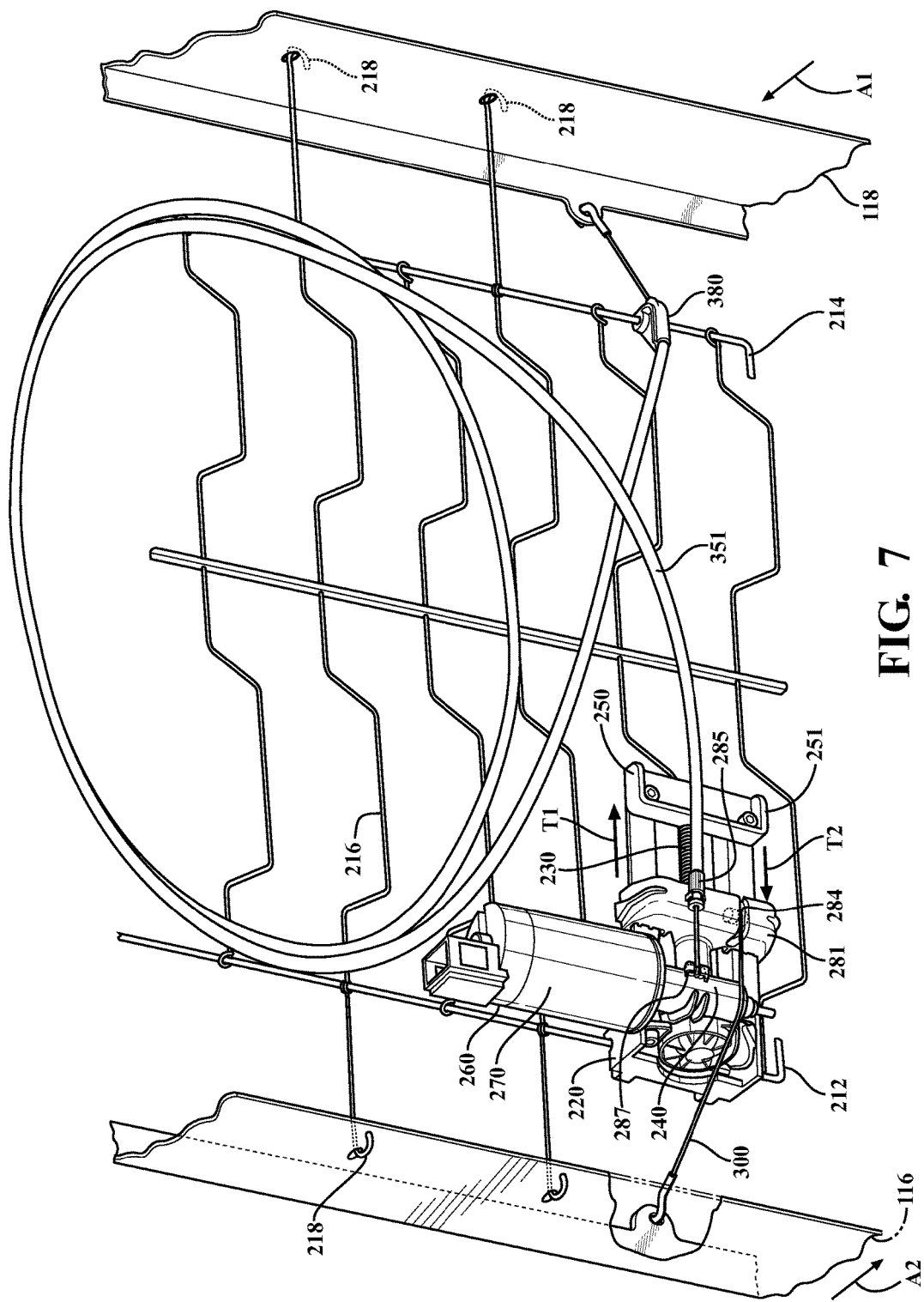
FIG. 7 is a perspective view of a section of the vehicle seat of FIG. 1 in a first configuration according to a second embodiment.
Figure 8:
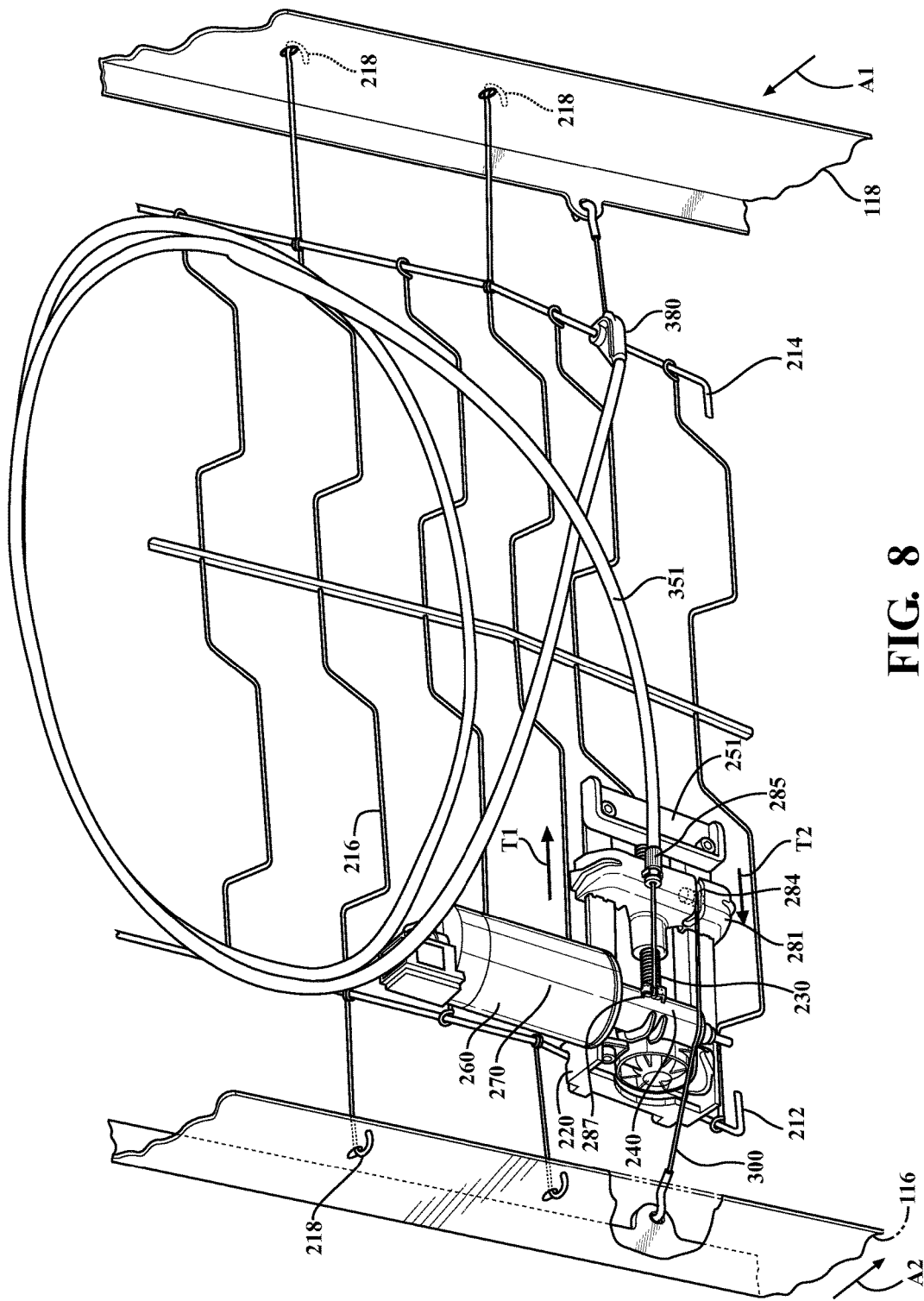
FIG. 8 is a perspective view of a section of the vehicle seat of FIG. 1 in a second configuration according to a second embodiment.

In a second embodiment as illustrated in FIGS. 7 and 8, the assembly 200 includes alternative second cable 351, drive block 281 and end stop 251. The second cable 351 includes first segment 360 extending from the seat support 205 and adapted for attachment to the seat frame 110. The second cable 351 further includes a second segment 370 adapted for engagement with the adjustment mechanism 210. This second segment 370 includes a third portion 372 coupled to the chassis and a fourth portion 374 coupled to the drive block 281 for movement therewith. As illustrated in FIGS. 7 and 8, the third portion 372 of second cable 351 includes the terminal end of the core element 335 coupled to the chassis 220 at the cable attachment feature 287 disposed on the gear box 240. The fourth portion 374 of second cable 351 includes the conduit end 331 coupled to the drive block 281 at cable port 285. The cable port 285 is disposed on the drive block 281, unlike the first embodiment wherein the cable port 255 is disposed on the end stop 250. In this second embodiment, the end stop 251 is provided to secure the second end 234 of the screw drive 230 to the chassis 220.

FIG. 7 illustrates a section of the vehicle seat in a first configuration according to this second embodiment. In this first configuration, the drive block 280 is proximate to the first end 232 of the screw drive, and the first segments 310 and 360 of first and second cables 300 and 350 are at a maximum extension.

FIG. 8 illustrates a section of the vehicle seat in a second configuration according to the second embodiment. In this second configuration, the drive block 281 has translated along the screw drive 230 toward second end 234, thereby increasing the first and second cable 300 and 350 length extending between the drive block 281 and the first end 232. The length of the first segments 310 and 360 are correspondingly decreased, causing the seat support 205 to adjust in the first adjustment direction A1.

Adjustment in the second adjustment direction A1 is achieved by actuating the screw drive 230 in the second rotational direction R2. This translates the drive block 280 toward the first end 232, thus increasing the length of the first segments 310 and 360 of the first cable 300 and second cables 350 in the first embodiment or second cable 351 in the second embodiment. The seat support 205 is therefore returned to the first configuration as illustrated in FIGS. 5 and 7, respectively. Although depicted in opposite extremes in the figures, it should be appreciated that a seat's occupant may selectively actuate the adjustment mechanism to cease adjustment at any point to achieve a continuously variable level of support between the two extremes.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An assembly for use in a seat having a seat frame, said assembly comprising:
   a seat support adapted for adjustable suspension in the seat frame, with said seat support adjustable in a first adjustment direction and a second adjustment direction opposite said first adjustment direction;
   a chassis mounted on said seat support;
   a screw drive supported on said chassis for rotation in a first rotational direction and in a second rotational direction opposite said first rotational direction;
   an actuator operably coupled to said screw drive to selectively generate said rotation of said screw drive;
   a drive block in threaded engagement with said screw drive such that said rotation of said screw drive in said first rotational direction translates said drive block along said chassis in a first translational direction and rotation of said screw drive in said second rotational direction translates said drive block along said chassis in a second translational direction opposite said first translation direction;
   a first cable having first and second segments with said first segment adapted for attachment to the seat frame, and said second segment having first and second portions with said first portion engaging said chassis and said second portion affixed to said drive block;
   a second cable having first and second segments with said first segment adapted for attachment to the seat frame, and said second segment having third and fourth portions with said third portion engaging said chassis and said fourth portion affixed to said drive block; wherein said second and fourth portions concurrently translate with said drive block in said first translational direction when said screw drive operates in said first rotational direction adjusting said seat support in said first adjustment direction and wherein said second and fourth portions concurrently translate with said drive block in said second translational direction when said screw drive operates in said second rotational direction adjusting said seat support in said second adjustment direction.

2. The assembly as set forth in claim 1, wherein at least one of said first cable and said second cable is a wire.

3. The assembly as set forth in claim 2, wherein said wire is further defined as one of a solid wire, a stranded wire and a braided wire.

4. The assembly as set forth in claim 1, wherein at least one of said first and second cables comprises a conduit and a core element.

5. The assembly as set forth in claim 4, wherein said core element is further defined as a wire selected from the group of a solid wire, a stranded wire and a braided wire.

6. The assembly as set forth in claim 4, wherein said third portion comprises a conduit end of said conduit and said fourth portion comprises a terminal end of said core element.

7. The assembly as set forth in claim 6, wherein said second portion comprises a terminal end of said first cable.

8. The assembly as set forth in claim 4, wherein said third portion comprises a terminal end of said core element and said fourth portion comprises a conduit end of said conduit.

9. The assembly as set forth in claim 1, wherein said second portion comprises a terminal end of said first cable and said fourth portion comprises a terminal end of said second cable.

10. The assembly as set forth in claim 1, wherein said chassis further comprises a guide feature.

11. The assembly as set forth in claim 10, wherein said drive block engages said chassis at said guide feature.

12. The assembly as set forth in claim 11, wherein said guide feature constrains said drive block against motion in two directions relative to said chassis.

13. The assembly as set forth in claim 10, wherein said guide feature comprises an edge extending parallel to said first translational direction.

14. The assembly as set forth in claim 13, wherein said drive block engages said edge.

15. The assembly as set forth in claim 1, wherein said seat support comprises first and second vertical rods.

16. The assembly as set forth in claim 15, wherein said seat support further comprises support wires extending between said first and second vertical rods.

17. The assembly as set forth in claim 15, wherein said chassis is mounted on one of said first and second vertical rods.

18. The assembly as set forth in claim 17, further comprising a connector mounted on the other of said first and second vertical rods with one of said first and second cables in engagement with said connector.

19. The assembly as set forth in claim 18, wherein at least one of said first and second cables comprises a conduit and a core element with said connector engaging a terminal end of said conduit and said core element extending beyond said connector for attachment to the seat frame.

20. The assembly as set forth in claim 1, wherein said actuator is a motor.

21. The assembly as set forth in claim 1, further comprising a gear box supported on said chassis with said gear box coupled to said actuator and said screw drive.

22. The assembly as set forth in claim 21, wherein said gear box comprises a worm operably coupled to one of said actuator and said screw drive and a worm gear operably coupled to the other of said actuator and said screw drive.

23. The assembly as set forth in claim 21, wherein said screw drive comprises a first end and a second end with said screw drive coupled to said gear box-at said first end, and said assembly further comprising an end stop supported on said chassis and engaging said second end of said screw drive.

24. The assembly as set forth in claim 21, wherein said first and third portions further include respective first sections routed about at least a portion of said gear box.

25. The assembly as set forth in claim 1, further comprising a cover supported on said chassis and encompassing said drive block and said screw drive.

* * * * *